US010489195B2

(12) United States Patent
Shimamura et al.

(10) Patent No.: US 10,489,195 B2
(45) Date of Patent: Nov. 26, 2019

(54) FPGA ACCELERATION FOR SERVERLESS COMPUTING

(71) Applicant: CISCO TECHNOLOGY, INC., San Jose, CA (US)

(72) Inventors: Komei Shimamura, London (GB); Xinyuan Huang, San Jose, CA (US); Amit Kumar Saha, Bangalore (IN); Debojyoti Dutta, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 193 days.

(21) Appl. No.: 15/655,648

(22) Filed: Jul. 20, 2017

(65) Prior Publication Data

US 2019/0026150 A1    Jan. 24, 2019

(51) Int. Cl.
G06F 9/48 (2006.01)
G06F 9/50 (2006.01)

(52) U.S. Cl.
CPC .......... G06F 9/4881 (2013.01); G06F 9/5038 (2013.01); G06F 9/5088 (2013.01)

(58) Field of Classification Search
CPC .................................................. G06F 9/4881
See application file for complete search history.

(56) References Cited

U.S. PATENT DOCUMENTS 6,493,804 B1   12/2002   Soltis et al.
8,949,847 B2    2/2015   Kim et al.
9,338,097 B2    5/2016   Anand et al.
9,436,443 B2    9/2016   Chiosi et al.
9,910,705 B1 *  3/2018   Mak ........................ G06F 21/57
2015/0082308 A1 3/2015   Kiess et al.
2016/0112502 A1 4/2016   Clarke et al.
2016/0179560 A1 6/2016   Ganguli et al.
2016/0212017 A1 7/2016   Li et al.
2016/0320873 A1 11/2016  Molka et al.
2017/0068574 A1 * 3/2017 Cherkasova .......... G06F 9/5044

FOREIGN PATENT DOCUMENTS

CN         102073546 A      7/2013

OTHER PUBLICATIONS

"AWS Lambda Developer Guide," Amazon Web Services Inc., Hamtad, May 2017, 416 pages.

(Continued)

Primary Examiner — Charlie Sun
(74) Attorney, Agent, or Firm — Polsinelli PC

(57) ABSTRACT

In one embodiment, a method for FPGA accelerated serverless computing comprises receiving, from a user, a definition of a serverless computing task comprising one or more functions to be executed. A task scheduler performs an initial placement of the serverless computing task to a first host determined to be a first optimal host for executing the serverless computing task. The task scheduler determines a supplemental placement of a first function to a second host determined to be a second optimal host for accelerating execution of the first function, wherein the first function is not able to be accelerated by one or more FPGAs in the first host. The serverless computing task is executed on the first host and the second host according to the initial placement and the supplemental placement.

20 Claims, 8 Drawing Sheets

(56) References Cited

OTHER PUBLICATIONS

"AWS Serverless Multi-Tier Architectures," Amazon Web Services Inc., Nov. 2015, 20 pages.
"Cisco and Intel High-Performance VNFs on Cisco NFV Infrastructure," White Paper, © 2016 Cisco I Intel, Oct. 2016, 7 pages.
"Cisco NSH Service Chaining Configuration Guide," Cisco Systems, Inc., Jul. 28, 2017, 11 pages.
"Cloud Functions Overview," CloudFunctions Documentation, Mar. 21, 2017, 3 pages; https://cloud.google.com/functions/docs/concepts/overview.
"Cloud-Native VNF Modelling," Open Source Mano, © ETSI 2016, 18 pages.
"Network Functions Virtualisation (NFV); Use Cases," ETSI, GS NFV 001 v1.1.1, Architectural Framework, © European Telecommunications Standards Institute, Oct. 2013, 50 pages.
"Understanding Azure A Guide for Developers," Microsoft Corporation, Copyright © 2016 Microsoft Corporation, 39 pages.
Capdevila, Pujol, P., "Deployment of NFV and SFC scenarios," EETAC, Master Thesis, Advisor: David Rincon Rivera, Feb. 17, 2017, 115 pages.
Ersue, Mehmet, "ETSI NFV Management and Orchestration—An Overview," Presentation at the IETF# 88 Meeting, Nov. 3, 2013, 14 pages.
Hejtmanek, Lukas, "Scalable and Distributed Data Storage," is.muni.cz, Jan. 2005, pp. 1-58.
Hendrickson, Scott., et al. "Serverless Computation with OpenLambda." Elastic 60, University of Wisconson, Madison, Jun. 20, 2016, 7 pages.
Pierre-Louis, Marc-Arthur, "OpenWhisk: A quick tech preview," DeveloperWorks Open, IBM, Feb. 22, 2016, 7 pages.
Weissman, Jon B. et al., "Optimizing Remote File Access for Parallel and Distributed Network Applications," users@cs.umn.edu, Oct. 19, 2017, pp. 1-25.
Westerbeek, Michiel, "Serverless Server-side Rendering with Redux-Saga," medium.com, Dec. 10, 2016, pp. 1-6.
Yadav, Rishi, "What real cloud-native apps will look like," Crunch Network, Aug. 3, 2016, 8 pages.
Jain, A., "Architecture Centric Coarse-Grained FPGA Overlays," Nanyang Technological University, Jan. 2017, 195 pages; http://www2.warwick.ac.uk/fac/sci/eng/staff/saf/publications/jain-phdthesis2017.pdf.
Putnam, A., et al., "A Reconfigurable Fabric for Accelerating Large-Scale Datacenter Services," Computer Architecture (ISCA), 41st International Symposium, Jun. 2014, 12 pages; https://www.microsoft.com/en-us/research/wp-content/uploads/2016/02/Catapult_ISCA_2014.pdf.
Kachris, C., et al., "A Survey on Reconfigurable Accelerators for Cloud Computing," Conference Paper, Aug. 2016, 11 pages; https://www.researchgate.net/profile/Christoforos_Kachris/publication/308846486_A_survey_on_reconfigurable_accelerators_for_cloud_computing/links/5809c60308ae04081348d9e8.pdf.
Neshatpour, K., et al., "Energy-Efficient Acceleration of Big Data Analytics Applications Using FPGAs," IEEE International Conference, Oct. 29, 2015, 9 pages; http://ece.gmu.edu/~hhomayou/files/BD2015-1.pdf.
Orellana J.P., et al., "FPGA-Aware Scheduling Strategies at Hypervisor Level in Cloud Environments," Hindawi, Scientific Programming, vol. 2016, Article ID 4670271, May 22, 2016, 10 pages; https://www.hindawi.com/journals/sp/2016/4670271/abs/.
Orellana J.P., et al., "FPGA-Aware Scheduling Strategies at Hypervisor Level in Cloud Environments," Hindawi Publishing Corporation, Scientific Programming, vol. 2016, Article ID 4670271, May 22, 2016, 13 pages; https://www.hindawi.com/journals/sp/2016/4670271/abs/.
Burt, J., "Intel Begins Shipping Xeon Chips With FPGA Accelerators," eWeek, Apr. 2016, 3 pages.
Kidane H.L., et al., "NoC Based Virtualized FPGA as Cloud Services," 3rd International Conference on Embedded Systems in Telecommunications and Instrumentation (ICESTI'16), Oct. 24, 2016, 6 pages; https://hal.archives-ouvertes.fr/hal-01396933/document.
Wikipedia contributors, "Serverless Computing," Wikipedia, The Free Encyclopedia, Jun. 11, 2017, 4 pages; https://en.wikipedia.org/wiki/Serverless_computing.
Fahmy S.A., et al., "Virtualized FPGA Accelerators for Efficient Cloud Computing," The University of Warwick, Cloud Computing Technology and Science (CloudCom), IEEE 7th International Conference, Nov. 30, 2015, 7 pages; http://wrap.warwick.ac.uk/74757/7/WRAP_cloudcom2015-fahmy.pdf.
Chen Yu-Ting, et al., When Apache Spark Meets FPGAs: A Case Study for Next-Generation DNA Sequencing Acceleration, The 8th USENIX Workshop on Hot Topics in Cloud Computing, Jun. 20, 2016, 7 pages; https://www.usenix.org/system/files/conference/hotcloud16/hotcloud16_chen.pdf.
"Xilinx Demonstrates Reconfigurable Acceleration for Cloud Scale Applications at SC16," PR Newswire, Nov. 7, 2016, 9 pages; http://news.sys-con.com/node/3948204.

* cited by examiner

```
SLC Task
{
"id": number,
"code": {}, // has one or more functions
"next_tasks": [{
            "rule_id": number
            "next_task_id": number,
                        }, ...]
}
```

FIGURE 2

```
Rule
{
   "id": number,
   "condition": {}
   "exec_when_true ": {}
   "exec_when_false ": {}
}
```

FIGURE 3

```
Ticket
{
    "id": number,
    "host_id": number,
    "resources": [
        {"name": "docker_container", "value": 5},
        {"name": "fpga_map_reduce_accelerator",
            " value ": 12},
        ...
    ]
}
```

FPGA ACCELERATION FOR SERVERLESS COMPUTING

TECHNICAL FIELD

This disclosure relates in general to the field of computing and, more particularly, to field programmable gate array (FPGA) acceleration for server computing infrastructure.

BACKGROUND

Cloud computing aggregates physical and virtual compute, storage, and network resources in the "cloud" and offers users many ways to utilize the resources. One kind of product leveraging cloud computing is called serverless computing (SLC). Serverless computing offers a high level of compute abstraction, with a great deal of scalability. Developers no longer need to worry about the underlying physical or even virtual infrastructure in the cloud. Often, serverless computing frameworks are offered as a service, e.g., Amazon Web Services (AWS) Lambda (a compute service that runs code in response to events (making serverless computing an event-driven framework) and automatically manages the compute resources required by the code). Developers can pay for compute time consumed. Code can be uploaded to the serverless computing framework, and the serverless computing framework handles the rest.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 illustrates an exemplary serverless computing task, according to some embodiments of the disclosure;

FIG. 3 illustrates an exemplary rule for a serverless computing system, according to some embodiments of the disclosure;

FIG. 8 illustrates an exemplary ticket, according to some embodiments of the disclosure.

DETAILED DESCRIPTION OF EXAMPLE EMBODIMENTS

Overview

Figure 1:
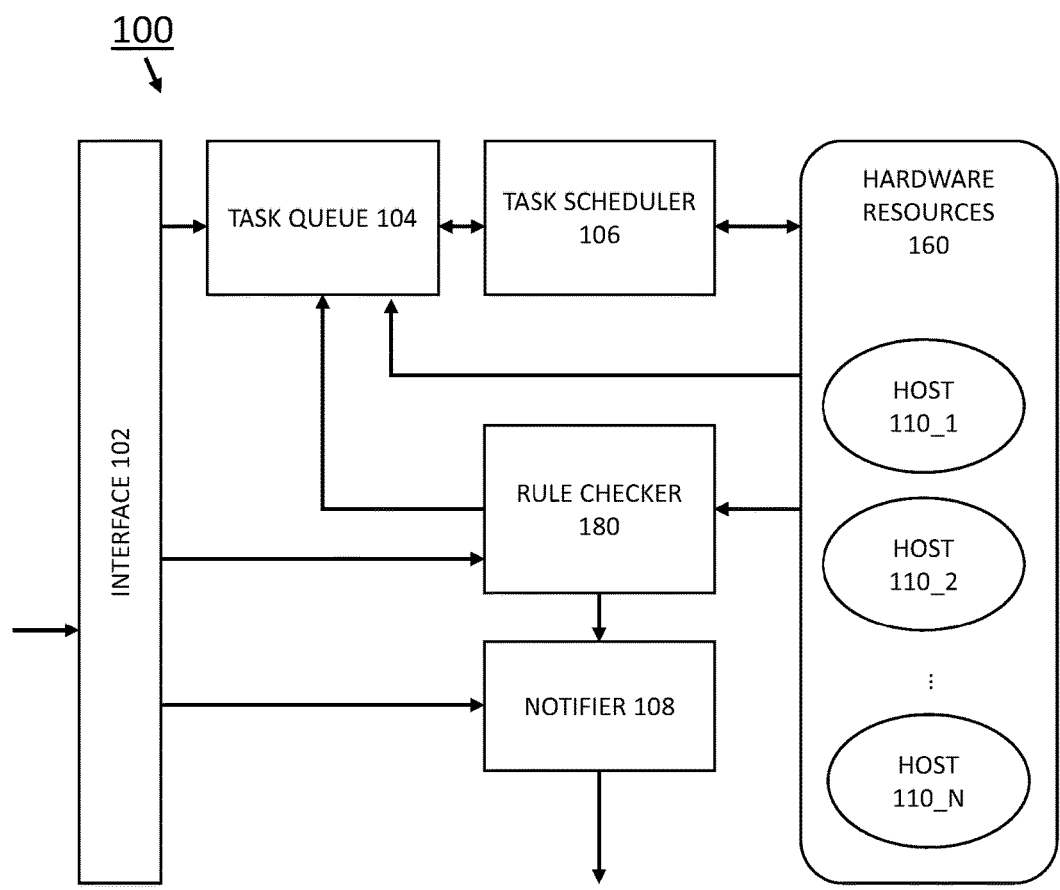
FIG. 1 illustrates an exemplary serverless computing system, according to some embodiments of the disclosure.

One aspect of the disclosure relates to, among other thing, a method for FPGA accelerated serverless computing comprises receiving, from a user, a definition of a serverless computing task comprising one or more functions to be executed. At least one of the functions is able to be accelerated by one or more FPGAs provided in hosts of a serverless computing environment. A task scheduler performs an initial placement of the serverless computing task to a first host determined to be a first optimal host for executing the serverless computing task. The task scheduler determines a supplemental placement of a first function to a second host determined to be a second optimal host for accelerating execution of the first function, wherein the first function is not able to accelerated by one or more FPGAs in the first host. The serverless computing task is executed on the first host and the second host according to the initial placement and the supplemental placement.

In other aspects, apparatuses comprising means for carrying out one or more of the method steps are envisioned by the disclosure. As will be appreciated by one skilled in the art, aspects of the disclosure, in particular the functionality associated with modelling and deploying scalable micro services herein, may be embodied as a system, a method or a computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g., a microprocessor, of a computer. Furthermore, aspects of the disclosure may take the form of a computer program product embodied in one or more computer-readable media having computer-readable program code embodied, e.g., stored, thereon.

Example Embodiments

Understanding Serverless Computing

Serverless computing works by having developers or users upload a piece of code to a serverless computing system (e.g., serverless computing platform or environment), and the serverless computing system provisions physical and virtual resources to runs the code without having to burden the developer or user with the setup of hosts or workers (i.e., networked hardware resources in the cloud, including compute, storage, and network resources) to execute the code. In some cases, serverless computing is called "function as a service". The cloud provider fully manages the underlying resources and when to start (and stop) using those resources based on a specification of the computation that needs to be executed. The user is completely hidden from the underlying infrastructure and does not need to purchase, provision, or manage any of the resources.

To use a serverless computing environment, a developer or user can upload a piece of code to be executed. The developer or user is abstracted from the setup and execution of the code in the networked hardware resources in the cloud. Serverless computing aims to provide a higher level of compute abstraction which allows developers and users to not have to worry about the underlying physical or even virtual infrastructure.

For some time, the code being executed on the serverless computing environment has been lightweight scripts that do not require a lot of computing resources to execute. As a result, users are able to execute code quickly and easily on the serverless system. However, the needs of users to run more data intensive scripts/jobs are growing as serverless computing gains popularity. Data intensive scripts are, just as the name suggests, scripts which processes a big amount of data. For instance, machine learning or artificial intelligence applications can involve data intensive scripts that processes a big amount of data. The data intensive scripts can easily increase processing time and eat up a lot of computing resources. At the same time, users demand and expect from serverless computing providers to offer a serverless computing systems that can run efficiently and quickly. Serverless computing providers want to ensure a certain service level for the users, while maintaining efficiency of the serverless computing system to manage overall costs for providing the serverless computing system.

It would be advantageous to build an improved serverless computing system or infrastructure that can accelerate processing of serverless computing tasks using FPGAs. Cloud computing has some solutions involving graphics processing unit (GPU) acceleration and FPGA acceleration, since GPUs and FPGAs have become more widely available. Some computer processing units (CPUs) even include FPGAs on the same die as the CPU. It is expected that FPGAs would be used in as much as 30 percent of data center servers by 2020. FPGAs are called accelerators because they can be used to accelerate high performance computations such as big data and parallel algorithms. However, some GPU and some FPGA accelerated cloud computing solutions are not applicable to serverless computing for various reasons.

Serverless computing with FPGA acceleration has its unique challenges which are not seen in big data analytics involving GPU and FPGA acceleration in pure distributed data processing frameworks. For instance, due to the restriction that FPGA cannot be reprogrammed in real-time, a fixed set of functions have to be deployed in advance on each host, this makes it different from other hardware acceleration problems such like that of GPUs. In another instance, serverless computing typically sees dynamic workloads, and the workloads can be difficult to predict. Users can often provide rules which may dynamically change the execution of the tasks. Serverless computing systems provide users with full flexibility of defining their own scripts to be executed, which means a single serverless computing task may include arbitrary combinations of accelerable (i.e., able to be accelerated) functions which can be located across multiple hosts. To fully accelerate different accelerable functions, a scheduling mechanism may need to consider moving task executions around multiple physical hosts, which makes it different from other scheduling solutions in cloud computing where one task is usually scheduled to one single host. Besides, serverless computing tasks can sometimes be triggered on customized, external conditions defined in rules provided by the user. In other words, the serverless computing system may not be able to plan the triggering of a serverless computing task, nor can it know in advance the amount of data to be processed when a task is triggered. To ensure a seamless user experience, the scheduling may need to be done as soon as possible when a serverless computing task is triggered, while making it possible to further adjust the placement when it encounters a large amount of data.

The following passages outline the details of FPGA acceleration for serverless computing system that addresses at least some of these unique challenges. A two-stage scheduling scheme with initial placement and supplemental placement can be implemented. An initial placement can enable fast and approximate scheduling decisions, and supplemental placement kick in to adjust placement when further accelerations are needed. The strategy scheme can accelerate the execution of compute-intensive serverless computing tasks by intelligently switching between CPU and FPGA execution environments for optimal performance.

Exemplary Serverless Computing System with FPGA Acceleration

FIG. 1 illustrates an exemplary serverless computing system 100, according to some embodiments of the disclosure. The system 100 includes one or more of the following: an interface 102, task queue 104, task scheduler 106, networked hardware resources 160 having hosts 110_1, 110_2, . . . 110_N, rule checker 180, and notifier 108.

The interface 102 allows a developer or user (machine) to interact with the serverless computing system 100 via a predefined application programming interface (API). Via the interface 102, a user can provide a definition of a serverless computing task (referred herein as "task definition"), associated with some piece of code or script, for the serverless computing system 100 to execute. The interface 102 can include a command line and/or a graphical user interface to facilitate the user interactions, such as inputting and specifying the task definition. The interface 102 is an abstraction layer which would allow a developer or user to use the serverless computing environment. Furthermore, a user can provide a definition of a rule via the interface 102. The rule can include condition(s) for triggering one or more tasks to be executed.

FIG. 2 illustrates an exemplary serverless computing task 200, according to some embodiments of the disclosure. The serverless computing task 200 can include an identifier "id", such as a number or some other data format. The identifier allows other data structures to reference the task. The serverless computing task 200 can include "code", e.g., script, to be executed by the serverless computing system. The "code" can include one or more functions to be executed by the serverless computing system. Typically, the "code" involves processing input data and generating output data. The serverless computing task 200 can include pointers or names to which input data and output data is/would be stored. A task definition as illustrated by serverless computing task 200 seen in FIG. 2 can be provided by the developer/user via interface 102 of FIG. 1.

Different from other serverless computing architectures, the serverless computing system 100 can receive a task definition which can specify a chain of tasks as part of a task, e.g., describing a work flow or data processing flow. Furthermore, each link in the chain of tasks optionally can be triggered based on a rule. This allows the serverless computing system 100 to take on dynamic workloads with complex work flows. A chain of tasks can link two more tasks together to be executed in sequence (e.g., one after another). In some cases, a task chain can be a directed acylic graph. For instance, a first task can generate some output, and a subsequent second task can process the output from the first task. Seen in FIG. 2, the serverless computing task 200 can include next tasks "next_tasks". "next_tasks" can include (optionally) an identifier "rule_id" for a rule triggering the execution of a subsequent task, and the identifier "next_task_id" for such subsequent task. The "next_tasks" can include a plurality of subsequent tasks and optionally associated rules for triggering the execution of the subsequent task.

FIG. 3 illustrates an exemplary rule 300 for a serverless computing system, according to some embodiments of the disclosure. The rule 300 can include an identifier an identifier "id", such as a number some other data format. The identifier allows other data structures to reference the rule. The rule 300 can include one or more conditions "condition". As described previously, tasks can be triggered based on user-specified or external conditions. Besides the ability to define a next/subsequent task as part of the task definition, a developer/user can trigger the execution of a task or action, based on the specified condition. For instance, a condition may check for a characteristic of an output data of the current task. For instance, the condition may check how large the output data is (e.g., determine if the size of the output data is greater than a threshold). If the condition is TRUE, the rule 300 may trigger the execution of a task or action specified in the field "exec_when_true". If the condition is FALSE, the rule 300 may trigger the execution of a task or action specified in the field "exec_when_false". The task being triggered can be another user-specified serverless computing task. An action being triggered can trigger a notification to be sent as output to the user, or perform another suitable action. The fields "exec_when_true" and "exec_when_false" may also include specifications for how the triggered task/action should be executed (e.g., specify a particular environment for the task to be executed). The fields "exec_when_true" and "exec_when_false" may point to one or more tasks, one or more actions, or a combination of both.

Referring back to FIG. 1, interface of 102 of FIG. 1 can receive one or more definitions of a serverless computing task (referred herein as "task definition") and optionally one or more rules. The task definitions and rules can come from a developer/user. The interface 102 can queue serverless computing tasks to task queue 104. Task queue 104 can include one or more data structures which stores tasks which are to be executed by the serverless computing system 100. The tasks which are stored in the task queue 104 can come from a plurality of sources, including from a developer/user via the interface 102. In some cases, the task can come from other sources such as rule checker 180, or directly from networked hardware resources 160 having hosts 110_1, 110_2, . . . 110_N. For instance, if a rule triggers the execution of another serverless computing task (a check which can be performed by rule checker 180), the rule checker 180 can send the serverless computing task being triggered to the task queue 104. In another instance, if a first serverless computing task is chained to a second serverless computing task (without a rule), a host which executed the first serverless computing task can send the second serverless computing task to the task queue 104. A task in the task queue 104 can be considered an execution unit or an action, which can include a set of binary codes and a shell script.

Networked hardware resources, e.g., networked hardware resources 160 having hosts 110_1, 110_2, . . . 110_N can fetch and execute the tasks from the task queue. Upon execution, the rule checker 180 can check the output to determine whether any conditions have been met. Rules can trigger other tasks to be added to task queue 104.

Rules can also trigger notifications to be sent to users by notifier 108. The interface 102 can accept notification definitions which requests notifier 108 to output one or more notifications based on one or more outputs from any one or more of the hosts 110_1, 110_2, . . . 110_N. For instance, the success/failure/status from an execution of a task can be output to a developer/user by notifier 108. In another instance, the output data or a derivation of the output data from executing of a task by any one or more of the hosts 110_1, 110_2, . . . 110_N can be output to a developer/user by notifier 108. Exemplary notifier 108 includes Hypertext Transfer Protocol (HTTP) notifier, Kafka notifier, etc.

Task scheduler 106 schedules and decides how to execute the tasks in the task queue 104. The task scheduler 106 can be responsible for assigning tasks to any one of the hosts 110_1, 110_2, . . . 110_N. Any one or more ones of the hosts seen can have one or more CPUs and one or more FPGAs. In some embodiments, the task scheduler 106 can implement optimization the assignment of tasks from the task queue to one or more ones of the hosts. In particular, tasks from task queue 104 can include one or more functions that can be executed by one or more hosts. Moreover, some functions are FPGA-accelerable. Details of task scheduling with FPGA acceleration are described in the following passages.

Shim Layer, Scheduling, and Data and Operation Forwarding Strategy

To provide FPGA acceleration, several features are implemented in a serverless computing system. One feature is a shim layer comprising a library and/or function registry. The shim layer allows users to invoke FPGA-accelerable functions directly in the "code" or script in a serverless computing task (e.g., "code" of serverless computing task 200 of FIG. 2). The library can serve as an interface. On one side, the library can provide user access to FPGA-accelerable functions. On the other side, the library can connect to FPGA processes in the backend. The function registry can allows an administrator or a monitoring entity to manage, e.g., insert and delete, functions for FPGA acceleration.

Another feature is a scheduling mechanism (e.g., implemented by task scheduler 106 of FIG. 1) that can schedule serverless computing tasks to hosts having FPGAs (e.g., hosts 110_1, 110_2, . . . 110_N of FIG. 1). The scheduling mechanism includes two parts: initial placement and supplemental placement. When a serverless computing task is submitted to the serverless computing system, the task scheduler 106 can analyze a variety of information for the initial placement to schedule the serverless computing task to an optimal host (a single host) where the serverless computing task can be executed. Considering the high performance of FPGA processors, the task scheduler 106 can let a same FPGA board to be shared among multiple tasks which invoke the same functions. The information being analyzed in the task scheduler 106 includes the workflow of the serverless computing task. For instance, the task scheduler 106 can determine a list of FPGA-accelerable function(s) invoked by the task definition. The information being analyzed in the task scheduler 106 can include historical statistics from previous execution of the same function. For instance, the task scheduler 106 can determine sizes of data processed in previous executions of the function. The information being analyzed in the task scheduler 106 can include performance information of relevant FPGA-accelerable functions. For instance, the task scheduler 106 can determine a typical execution time needed for the function in both FPGA and CPU. The performance data can be collected by offline experiments and be accessible through a lookup table in production. The information being analyzed in the task scheduler 106 can include real-time status of available hosts. For instance, the task scheduler 106 can determine the current task load for both FPGA and CPU of various hosts.

After making initial placement decisions, the task scheduler 106 continues to work out a supplemental placement solution when applicable. The supplemental placement is to solve the problem that a host where a serverless computing task is executed might not be able to support all the required FPGA-accelerable functions. For instance, if execution of a particular FPGA-accelerable function (not supported by the host assigned to execute a given serverless computing task during the initial placement phase) using local CPU would take a longer than acceptable amount of time, then supplemental placement can schedule or redirect the specific function to another host whose FPGA(s) can support it. The decision of whether or not to perform supplemental placement can be made with a forwarder on a host in run-time instead of schedule-time, however the supplemental placement solution (e.g., determining a destination where the function execution can be forwarded to) can be calculated by task scheduler 106 and provided to the forwarder in advance, so as to allow forwarders to make efficient decisions at run-time.

Yet another feature is a data and operation forwarding strategy that can optimize task execution through FPGA resource sharing both locally on a host and remotely across multiple hosts. As discussed previously, supplemental placement can be triggered if desired. Supplemental placement generally involves forwarding data to be processed to another host which can optimally accelerate the execution of a function using an FPGA. When a serverless computing task is being executed, a hidden data forwarder can be inserted into the process where FPGA accelerated functions are invoked. The data forwarder can forward data to FPGAs both locally on the same host and remotely on other hosts. This forwarder can be implemented in the software library. Several instances of the forwarder can be implemented for a serverless computing task being executed across multiple hosts to carry out the data and operation forwarding strategy and direct data to the appropriate destination for optimal processing. During run-time, the forwarder can make decisions to forward the execution of accelerated functions to one of the following destinations to achieve optimal performance: local CPU (no forwarding to a remote host), local FPGA device, and remote FPGA device (triggered when supplemental placement condition is met). A forwarder can also send output data back to the original process after a remote FPGA device finishes processing the data.

Initial Placement and Supplemental Placement

Both initial placement and supplemental placement can be seen as optimization problems where various possible placement solutions are evaluated to determine which one of the possible placement solutions is optimal. Phrased differently, an objective function yielding a "score" can be evaluated based on one or more factors. A score can be calculated for the possible placement solutions, and a placement solution which optimizes the objective function can be selected. Optimizing the objective function can mean finding a placement solution which has the highest or higher score, or alternatively, finding a placement solution which has the lowest or lower score.

For the initial placement, let X be the placement matrix where $x_{i,j} \in \{0,1\}$ indicates whether or not to place jth task in ith host, the main objective of the problem is to choose the most proper placement matrix $X_{opt}$, so as to minimize the overall execution time needed to execute the function(s) in a serverless computing task. Given a host i and a serverless computing task j, let $S_i^h$ and $S_j^t$ denote the set of accelerated functions provided by the host and that required by the serverless computing task, respectively. Given an accelerated function $k \in S_j^t$, let $\hat{d}_{j,k}$ denote the predicted size of data input from serverless computing task j to function k. The predicted size of data input may be determined using either historical statistics or deterministic methods. Then the execution time of all the supported accelerated functions on host i can be estimated by:

$$T_i^f = \sum_{k \in S_i^h \cap S_j^t} F_k^f \left( \sum_j \hat{d}_{j,k} x_{i,j}, q_i^f \right)$$

$F_k^f(\bullet)$ estimates function k's execution time on specified host using FPGA acceleration, $q_i^f$ denotes the estimated load of FPGA function executions waiting to be processed on host i. The execution time of all the non-supported accelerated functions on host i can be estimated by:

$$T_i^c = \sum_{k \in S_j^t \setminus S_i^h} F_k^c \left( \sum_j \hat{d}_{j,k} x_{i,j}, q_i^c \right)$$

$F_k^c(\bullet)$ estimates function k's execution time on specified host using CPU, $q_i^c$ denotes the estimated load of CPU function executions waiting to be processed on host i.

The initial placement problem can be formulated as follows:

$$X_{opt} = \underset{X}{\operatorname{argmin}} \left[ \sum_i (T_i^f + T_i^c) \right]$$

Subject to:

$$\forall j \in [1, N]: \sum_{i=1}^{M} x_{i,j} = 1$$

M is the total number of available hosts, and N is the total number of tasks to be placed.

A supplemental placement allows an FPGA-accelerable function that is not supported by a host to be executed by a remote host which supports the FPGA-accelerable function. In some cases, the supplemental placement allows for an FPGA-accelerable function that can be more optimally (e.g., better off) executed by a remote host which supports the FPGA-accelerable function. During run-time, supplemental placement (i.e., actual supplemental placement and data and operation forwarding) can be triggered on the condition that actual input data size of $d_{j,k}$ significantly exceeds the predicted value $\hat{d}_{j,k}$. The condition generally indicates that supplemental placement may be suitable for improving execution time. The determination of where to place the function can be determined at schedule-time or at run-time. Given a task j running on host i, the objective of supplemental placement is to choose the most proper host to direct the FPGA-accelerable function to, so as to minimize its execution time. This can be formulated as follows:

$$l_{opt} = \underset{l}{\operatorname{argmin}} \left[ F_k^f (d_{j,k}, q_i^f) + G(d_{j,k}, c_{i,l}) \right]$$

$G(\bullet)$ estimates the network communication overhead or cost. $c_{i,l}$ denotes the network latency cost between host i and host l.

Exemplary Task Scheduling in Serverless Computing with FPGA Acceleration

The task scheduling schemes with FPGA acceleration can take some of the following factors into consideration. FPGAs have high performance but are relatively less flexible for general purpose computing. FPGA boards can be programmed offline and then deployed to production to accelerate hosts. Each board is pre-loaded with a certain set of kernels supporting a corresponding subset of accelerated functions that can be invoked by the user. An FPGA can support one or more FPGA-accelerable functions. The accelerated functions are referred herein as FPGA-accelerable functions, which can be invoked using the shim layer. The physical cluster (e.g., networked hardware resources 160 of FIG. 1) of the serverless computing system has a pool of FPGA boards distributed among a number of hosts (e.g., hosts 110_1, 110_2, . . . 110_N of FIG. 1). The boards on different hosts may or may not support the same subset of accelerated functions. A task definition having "code" or script can include one or more function invocations. The "code" or script can invoke one or more normal functions (to be executed by a CPU). The "code" or script can invoke one or more FPGA-accelerable functions (to be executed by an FPGA). The "code" or script can include a combination of normal functions (to be executed by a CPU) and an arbitrary subset of FPGA-accelerable functions (to be executed by an FPGA). FPGA-accelerable functions invoked by the "code" or script may or may not be completely supported by a single host.

Figure 4:
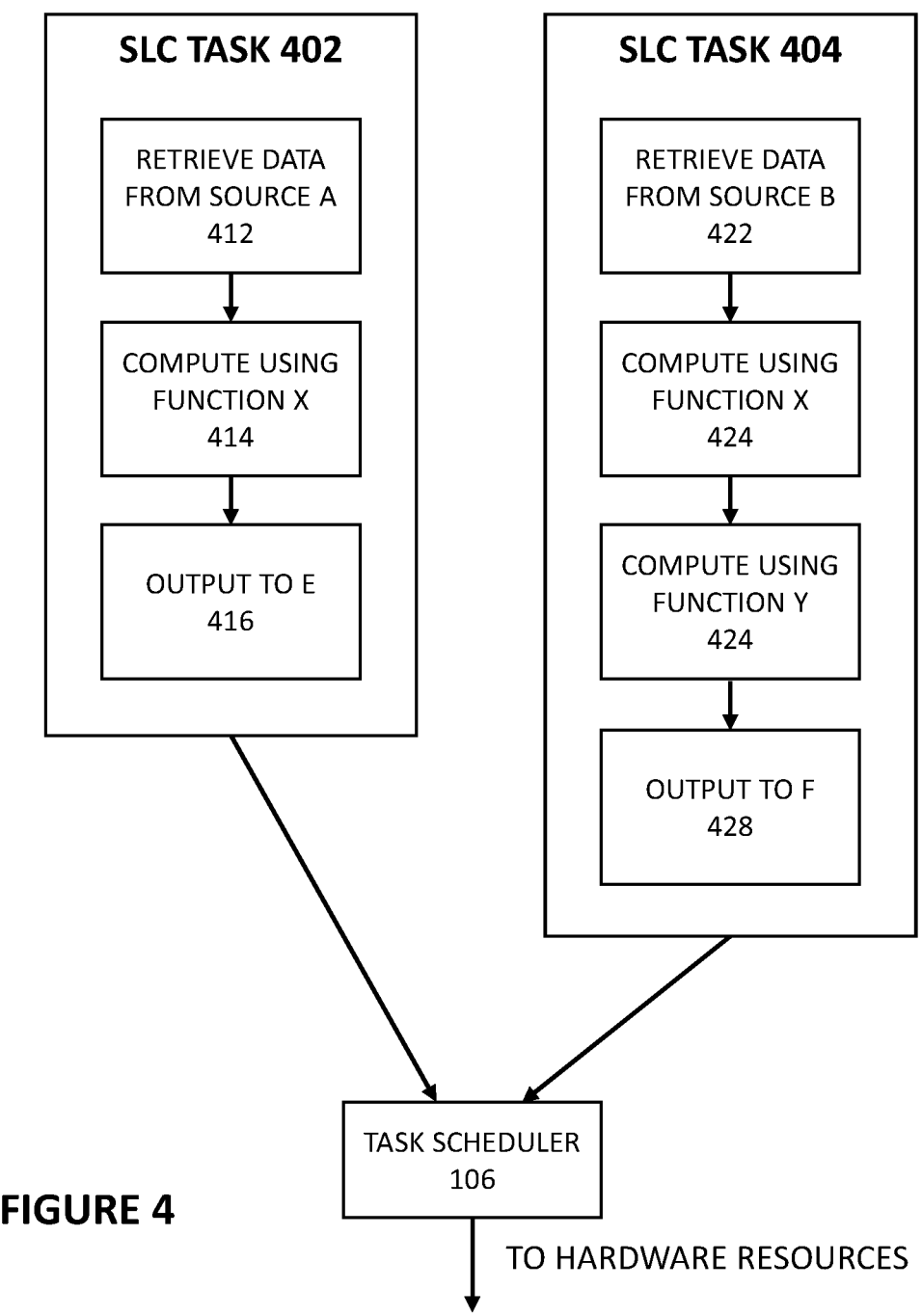
FIG. 4 illustrates two exemplary serverless computing tasks being provided to a task scheduler, according to some embodiments of the disclosure.
Figure 5:
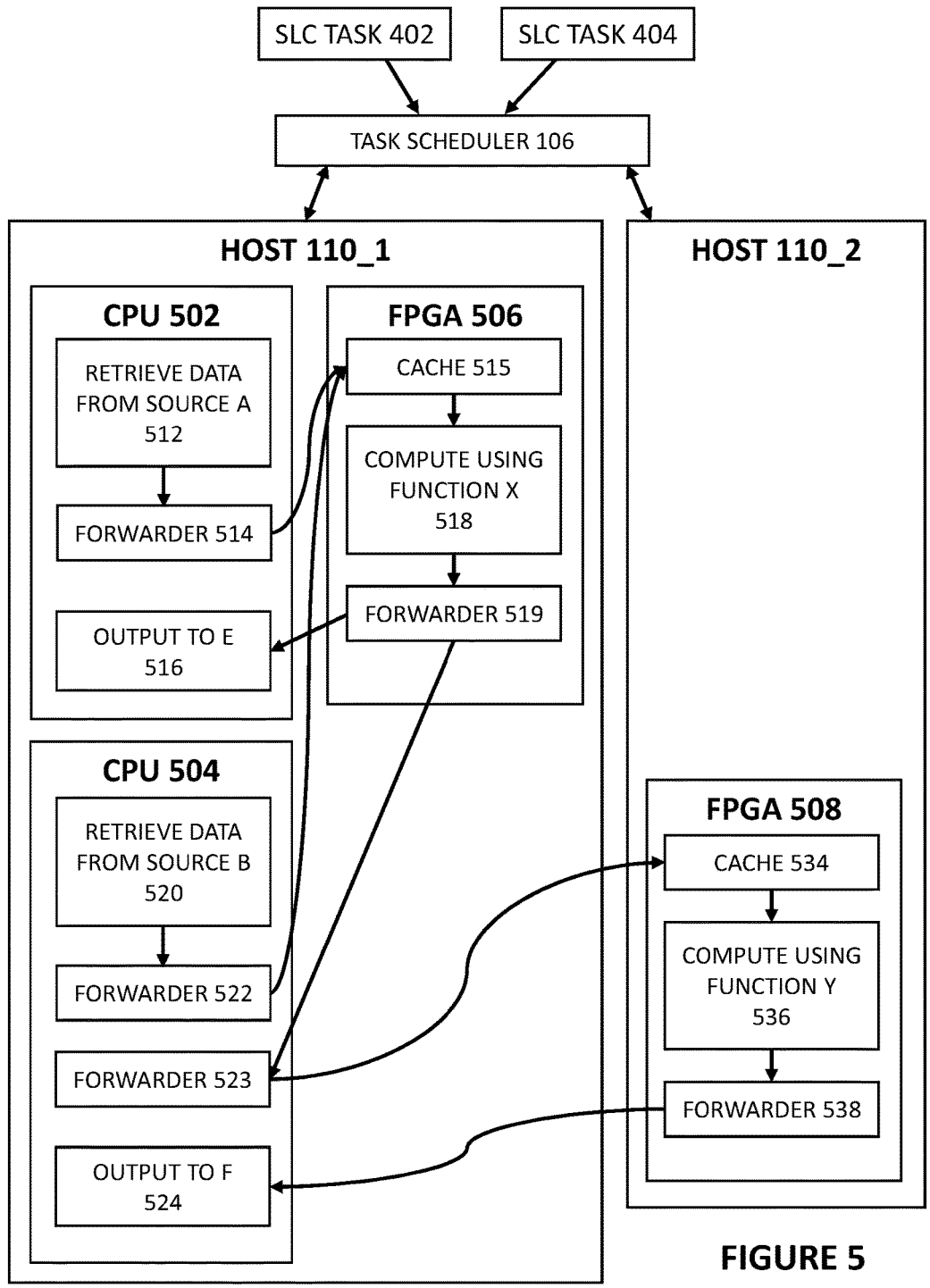
FIG. 5 illustrates scheduling and execution of the two exemplary serverless computing tasks, according to some embodiments of the disclosure.

To illustrate, FIGS. 4 and 5 show an example of scheduling, execution, and data and operation forwarding for two serverless computing tasks. Specifically, FIG. 4 illustrates exemplary serverless computing tasks 402 and 404 being provided to task scheduler 106, according to some embodiments of the disclosure, and FIG. 5 illustrates scheduling and execution of the two exemplary serverless computing tasks 402 and 404, according to some embodiments of the disclosure. The task definition of serverless computing task 402 defines that the serverless computing task 402 retrieves data from source A (412), computes using function X in (414), and outputs to E (416). The task definition of serverless computing task 404 retrieves data from source B (422), computes using function X in (424), computes using function Y (424), and outputs to F (428). The two exemplary serverless computing tasks are provided as input, possibly from a task queue, to task scheduler 106 for scheduling. Specifically, task scheduler 106 can determine initial and supplemental placement for the two exemplary serverless computing tasks 402 and 404. Note that the two task definitions of the two serverless computing tasks 402 and 404 are different, but invokes the same FPGA-accelerable function X in the library. Seen in FIG. 5 are two exemplary hosts 110_1 and 110_2. Host 110_1 can run two CPU processes (which can be running on a single CPU device or multiple CPU devices), illustrated by CPU 502 and CPU 504. Host 110_1 can run an FPGA process (running on an FPGA accelerator device) shown as FPGA 604 which supports function X. Host 110_2 can run an FPGA process (running on an FPGA accelerator device) shown as FPGA 508 which supports function Y.

For initial placement, task scheduler 106 can place both serverless computing task 402 and serverless computing task 404 on host 110_1, where the two serverless computing tasks 402 and 404 would share the same FPGA process to execute the accelerated function X.

Executing serverless computing task 402 involves the following:
the CPU 502 on host 110_1 retrieving data from source A (512),
the CPU 502 providing output data (data from source A) to forwarder 514,
the forwarder 514 transferring the output data to cache 515 of FPGA 506,
caching the data in cache 515,
the FPGA 506 computing using function X (518) using data in cache 515,
the FPGA 506 providing output data of function X (518) to forwarder 519,
the forwarder 519 transferring data back to CPU 502, and
the CPU 502 outputting to E (516).

Executing serverless computing task 404 can involve utilizing both host 110_1 and 110_2 through supplemental placement:
the CPU 504 on host 110_1 retrieving data from source B (520),
the CPU 504 providing output data to forwarder 522,
the forwarder 522 transferring the output data to cache 515 of FPGA 506,
caching the data in cache 515,
the FPGA 506 computing using function X (518) using data in cache 515,
the FPGA 506 providing output data of function X (518) to forwarder 519,
the forwarder 519 transferring the output data back to CPU 504, namely forwarder 523,
the forwarder 523 evaluating supplemental placement condition(s),
determining supplemental placement is desirable, the forwarder 523 transferring the output data to cache 534 of FPGA 508 on remote host 110_2,
caching the data in cache 534,
the FPGA 508 computing using function Y (536) using data in cache 534,
the FPGA 508 providing output data of function Y (536) to forwarder 538,
the forwarder 538 transferring the output data back to CPU 504, and
the CPU 504 outputting to F (524).

For supplemental placement, task scheduler 106 determines and provides supplemental placement solution(s) to the forwarder 523 in the case of executing serverless computing task 404. The supplemental placement solution and the data and operation forwarding strategy implements forwarding data to host 110_2 for the execution of FPGA accelerated function Y. At run-time, the forwarder makes forwarding decision based on actual data size to be processed (e.g., data size of output data of function X) as well as the local CPU condition (e.g., evaluating conditions of resources on host 110_1), then performs forwarding to the destination based on a supplemental placement solution determined and supplied by task scheduler 106. After the FPGA in the remote host (e.g., host 110_2) finishes processing, the output data is forwarded back to the host in the initial placement (e.g., host 110_1).

Method for FPGA Accelerated Serverless Computing

Figure 6:
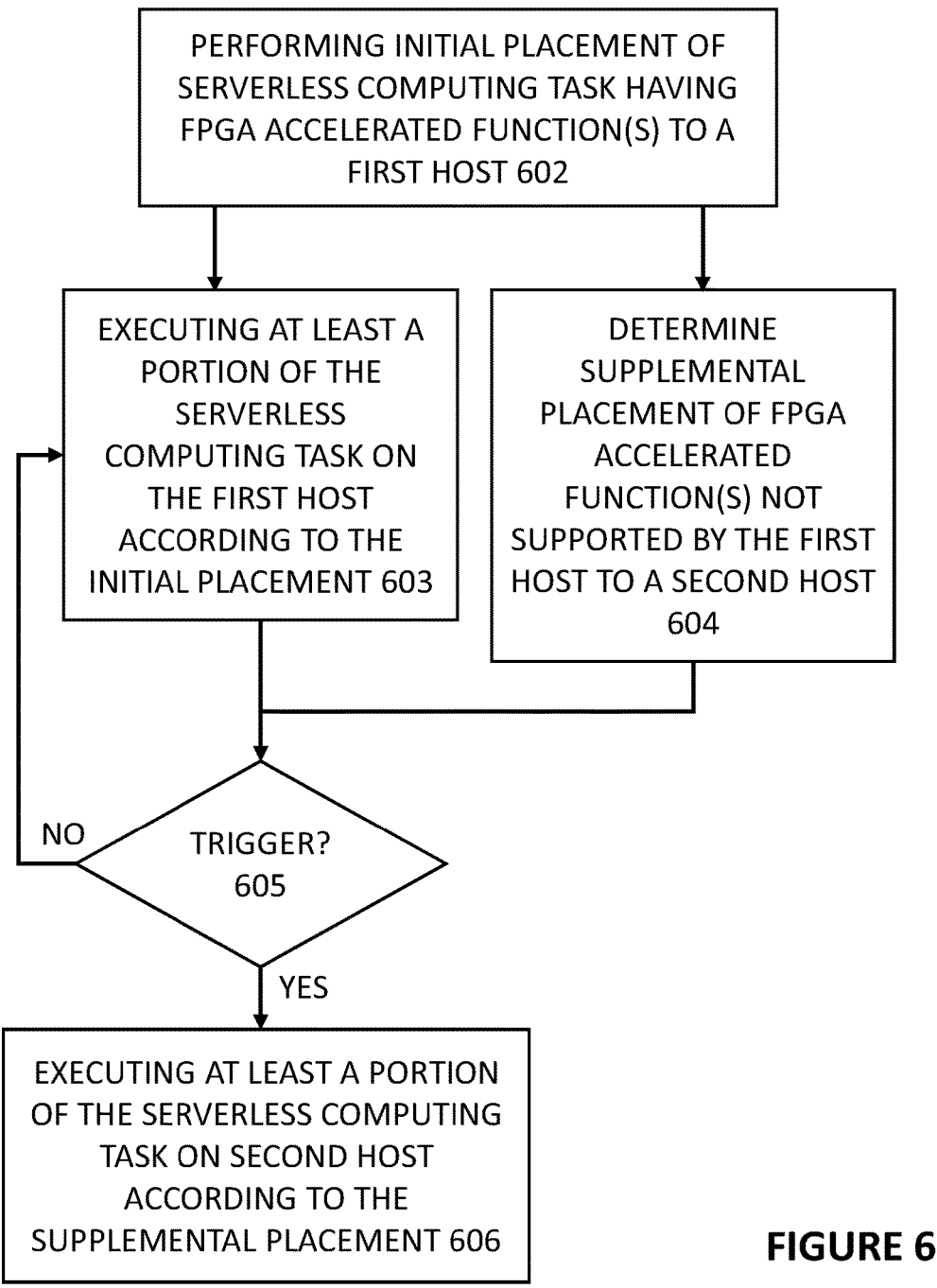
FIG. 6 shows a flow diagram of a method for FPGA accelerated serverless computing, according to some embodiments of the disclosure.

FIG. 6 shows a flow diagram of a method for FPGA accelerated serverless computing, according to some embodiments of the disclosure. The method can be executed by the systems illustrated in the FIGURES. The method for FPGA accelerated serverless computing can include receiving, from a user, a definition of a serverless computing task comprising one or more functions to be executed. The definition can be received via an interface to a serverless computing system (e.g., interface 102 of the FIGURES). An exemplary definition of a serverless computing task is illustrated in FIG. 2. At least one of the functions in the definition is able to be accelerated by one or more FPGAs provided in hosts of a serverless computing environment (e.g., hosts 110_1, 110_2, . . . 110_N in the FIGURES). The functions which are able to be accelerated by FPGAs are typically specialized functions programmed or configured onto the FPGA. Exemplary functions that can be accelerated by FPGAs include map-reduce, machine learning algorithms, pre-programmed neural networks for performing prediction based on input data, etc.

In 602 of FIG. 6, a task scheduler (e.g., task scheduler 106 of the FIGURES) can perform an initial placement of the serverless computing task to a first host determined to be a first optimal host for executing the serverless computing task. The task scheduler can determine the initial placement of the serverless computing task based on the initial placement optimization scheme described herein. For instance, determining the initial placement can include estimating each host's execution time of the serverless computing task (including one or more functions being invoked in the definition) for each host over a plurality of hosts, and selecting the first host having less execution time than other hosts. Execution time of a serverless computing task may include execution time of normal CPU function(s) and execution time of FPGA-accelerable function(s) which are supported by a given host. In some cases, other factors can be taken into account when determining the optimal host, such as cost for using the given host, load on the given host, etc. The result of initial placement finds a single optimal host for placing the serverless computing task based on the possible hosts and FPGA-accelerable functions available on the possible hosts.

In 603 of FIG. 6, at least a portion of the serverless computing task is executed on the first host according to the initial placement. By placing the serverless computing task with initial placement, the serverless computing task can begin execution quickly on the first (optimal) host.

In 604 of FIG. 6, the task scheduler can determine a supplemental placement of a first function to a second host determined to be a second optimal host for accelerating execution of the first function. The "first" function merely refers to one of the one or more FPGA-accelerable functions invoked in the serverless computing task, and not necessarily the first one in a series of FPGA-accelerable functions invoked in the serverless computing task. In other words, "first" does not necessarily imply the order of the first function within the one or more FPGA-accelerable functions invoked in the serverless computing task. Placing the first function on the second host is considered supplemental placement of the first function. The task scheduler can (at schedule-time and/or run-time) determine the supplemental placement of the serverless computing task based on the supplemental placement optimization scheme described herein. In some cases, supplemental placement is determined by the task scheduler while a portion of the serverless computing task is being executed on the first host. Determining the supplemental placement of the first function can include estimating network communication overhead of data being redirected from the first host to each host which is not the first host, estimating execution time of the first function on each host which is not the first host, and selecting the second host having less network communication overhead and execution time than other hosts. Supplemental placement determines/selects a host which has the least combined/overall network communication overhead and execution time. For the first host, i.e., the local host, the network communication overhead may be zero. Supplemental placement may determine that the first host is the optimal host if the execution time at the first host is less than the combined network communication overhead and execution time at other hosts. In some cases, supplemental placement may determine that a remote host (e.g., the second host) has a less combined network communication overhead and execution time than the local host (with zero network communication overhead) and other remote hosts. In some cases, other factors can be taken into account when determining the optimal host for supplemental placement, such as cost for using the given host, load on the given host, etc. The result of initial placement finds a remote host which is optimal for accelerating the first function based on the possible hosts and FPGA-accelerable functions available on the possible hosts.

Certain condition(s), during run-time, can trigger supplemental placement to be performed. For instance, a first FPGA-accelerable function in the serverless computing task is not able to accelerate by one or more FPGAs in the first host, or the first function may be better executed in a (remote) second host. In 605 of FIG. 6, a forwarder (hidden process) on a host can trigger (at run-time) the supplemental placement based on a supplemental placement condition, such as a trigger based on actual work load size. In some embodiments, the forwarder can trigger the supplemental placement based on an actual input data size to the first function during run-time exceeding a predicted input data size to the first function. A task scheduler can provide the result of supplemental placement to the forwarder to execute the first function on the optimal remote host.

In 606, the serverless computing system executes at least a portion of the serverless computing task on the second host according to the supplemental placement, in response to the supplemental placement condition being met. If the supplemental placement condition is not met, the serverless computing task continues execution on the first host according to the initial placement (603). Executing the serverless computing task across multiple hosts involves implementing a data and/or operation forwarding strategy. A first data forwarder can be provisioned for forwarding data to be processed by the first function from the first host to the second host. The first function can then be executed on a FPGA on the second host. A second data forwarder can be provisioned for forwarding data output by the first function from the second host to the first host.

Typically, it is costly to calculate placements. Because serverless computing users demand quick execution, it is beneficial to perform initial placement (602) to relatively quickly schedule and place the serverless computing task onto a host to begin execution (603). This means that the serverless computing task can begin execution on the first host (603) before or while supplemental placement is being determined (604). When there is a need or desire to provide further scheduling on other FPGA-accelerable functions (605), one or more further supplemental placements can be triggered at run-time to further optimize execution. For instance, supplemental placement in 604 can be determined for a second FPGA-accelerable function, a third FPGA-accelerable function, etc. "Second" or "third" does not necessarily imply a particular order of functions in the serverless computing task, but merely distinguishes between different FPGA-accelerable functions that could be invoked in a serverless computing task. If certain conditions are met, the further supplemental placements can be triggered. The functions can be executed according to the initial placement and further supplemental placements (as described for 606), on a variety of hosts.

Managing Available FPGA Resources in Serverless Computing Systems

Figure 7:
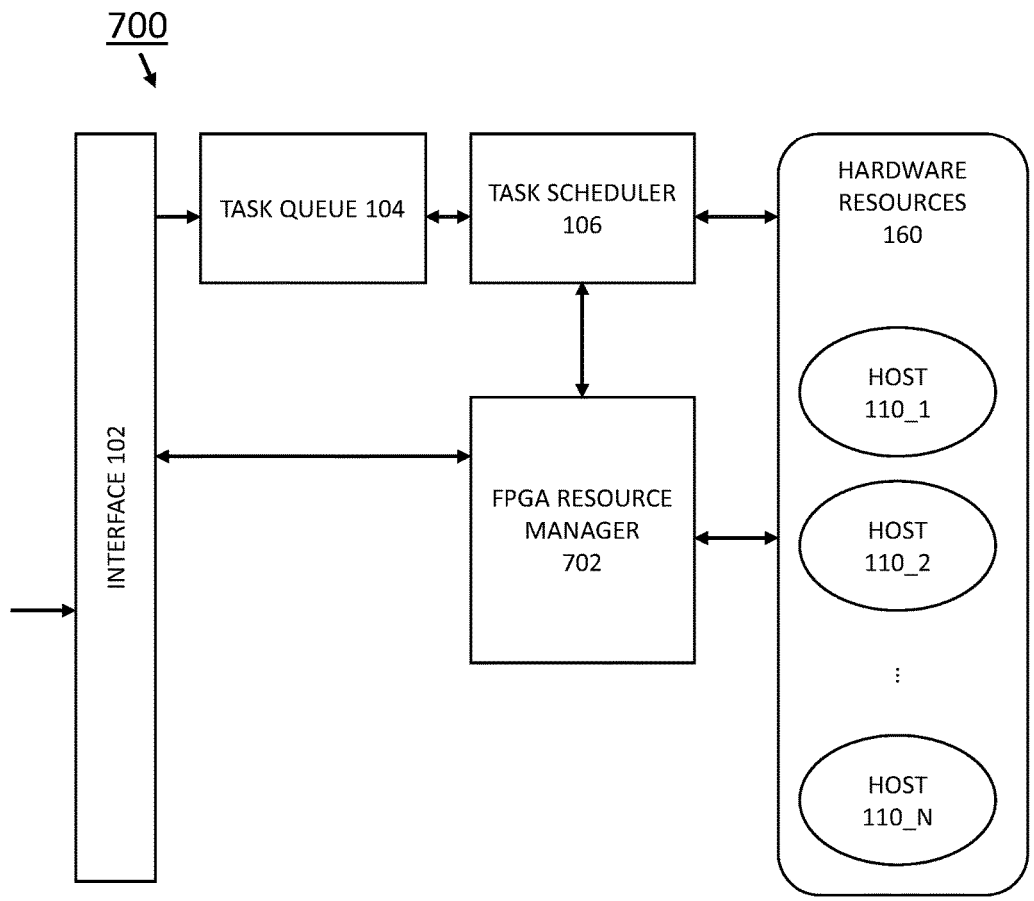
FIG. 7 illustrates an exemplary serverless computing system having an FPGA resource manager, according to some embodiments of the disclosure.

Managing FPGA resources is not trivial. The FPGA devices can be programmed initially to implement a specialized function and placed in production. From time to time, a FPGA device can be taken out of production and reprogrammed to perform a different specialized function. The FPGAs can be reprogrammed based on demand as well. FIG. 7 illustrates an exemplary serverless computing system having an FPGA resource manager 702, according to some embodiments of the disclosure. Resource manager 702 can receive tickets from networked hardware resources 160 having hosts 110_1, 110_2, . . . 110_N. For instance, resource manager 702 can receive tickets from the first host and the second host (mentioned with respect to the method illustrated by FIG. 6) comprising information associated with available FPGA-accelerable functions on the first host and information associated with available FPGA-accelerable functions on the second host. Performing the initial placement and determining the supplemental placement comprise determining the initial placement and the supplemental placement based on the tickets. The resource manager 702 can reconcile the available resources advertised in the tickets with information being considered during the scheduling scheme. The information can include the set of FPGA-accelerable functions and load on the hosts. Furthermore, the resource manager 702 can reconcile the available resources with the interface 102, and/or the shim layer to ensure that the task definitions can invoke available FPGA-accelerable functions.

FIG. 8 illustrates an exemplary ticket 800, according to some embodiments of the disclosure. The ticket can include an "id", which is an identifier for identifying the ticket. The ticket can also include a "host_id", which is an identifier for identifying the host associated with the ticket. The ticket can include a list of resource(s) available or list of resources being used (consumed/busy) on the host. In some cases, the ticket can include information regarding the current load on the host, and any other statistics about the host. The list of resources can identify the available and/or used amount of each resource. Resources can relate to any one or more of the following: a number of containers available or used, a number of FPGAs supporting a certain function available or used, a number of CPUs available or used, a percentage of CPU available or used. An exemplary entry in the list of resources can include a name of the resource ("name"), and a number of instances or amount of the resource being used or available ("value"). In the exemplary ticket 800, an exemplary host has 5 available containers ("docker_container") and 12 available FPGAs supporting map-reduce function ("fpga_map_reduce_accelerator").

Data Processing System

Figure 9:
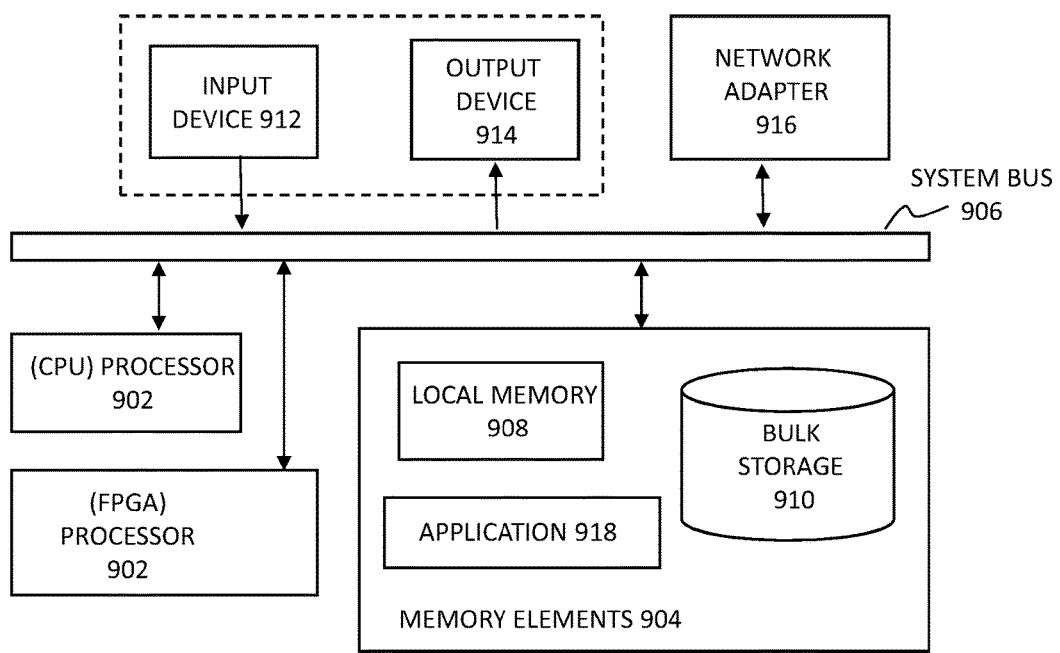
FIG. 9 illustrates an exemplary data processing system, according to some embodiments of the disclosure.

FIG. 9 depicts a block diagram illustrating an exemplary data processing system 900 (sometimes referred herein as a "node") that may be used to implement the functionality associated with any parts of the serverless computing system (e.g., parts of serverless computing system 100 of FIG. 1 and parts of serverless computing system 700 of FIG. 7) or user (machines) accessing any one part of the serverless computing system (e.g., via interface 102), to carry out FPGA acceleration in serverless computing systems, according to some embodiments of the disclosure. For instance, networked hardware resources having the functionalities implemented thereon, may have one or more of the components of the system 900. The data processing system 900 can be implemented to execute functions associated with, e.g., interface 102, task scheduler 106, various forwarders illustrated by FIG. 5, rule checker 180, notifier 108, and FPGA resource manager 702.

As shown in FIG. 9, the data processing system 900 may include at least one processor 902 coupled to memory elements 904 through a system bus 906. As such, the data processing system may store program code within memory elements 904. Further, the processor 902 may execute the program code accessed from the memory elements 904 via a system bus 906. In one aspect, the data processing system may be implemented as a computer that is suitable for storing and/or executing program code. It should be appreciated, however, that the data processing system 900 may be implemented in the form of any system including a processor and a memory that is capable of performing the functions described within this Specification.

The memory elements 904 may include one or more physical memory devices such as, for example, local memory 908 and one or more bulk storage devices 910. The local memory may refer to random access memory or other non-persistent memory device(s) generally used during actual execution of the program code. A bulk storage device may be implemented as a hard drive or other persistent data storage device. The processing system 900 may also include one or more cache memories (not shown) that provide temporary storage of at least some program code in order to reduce the number of times program code must be retrieved from the bulk storage device 910 during execution.

Input/output (I/O) devices depicted as an input device 912 and an output device 914 optionally can be coupled to the data processing system. User (machines) accessing the interface 102 would typically have such I/O devices. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers. In an embodiment, the input and the output devices may be implemented as a combined input/output device (illustrated in FIG. 9 with a dashed line surrounding the input device 912 and the output device 914). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 916 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 900, and a data transmitter for transmitting data from the data processing system 900 to said systems, devices and/or networks. Modems, cable modems, and Ethernet cards are examples of different types of network adapter that may be used with the data processing system 900.

As pictured in FIG. 9, the memory elements 904 may store an application 918. In various embodiments, the application 918 may be stored in the local memory 908, the one or more bulk storage devices 910, or apart from the local memory and the bulk storage devices. It should be appreciated that the data processing system 900 may further execute an operating system (not shown in FIG. 9) that can facilitate execution of the application 918. The application 918, being implemented in the form of executable program code, can be executed by the data processing system 900, e.g., by the processor 902. Responsive to executing the application, the data processing system 900 may be configured to perform one or more operations or method steps described herein.

Persons skilled in the art will recognize that while the elements 902-918 are shown in FIG. 9 as separate elements, in other embodiments their functionality could be implemented in lesser number of individual elements or distributed over a larger number of components.

EXAMPLES

Example 1 is a method for field programmable gate array (FPGA) accelerated serverless computing, comprising: receiving, from a user, a definition of a serverless computing task comprising one or more functions to be executed, wherein at least one of the functions is able to be accelerated by one or more FPGAs provided in hosts of a serverless computing environment; performing an initial placement of the serverless computing task to a first host determined to be a first optimal host for executing the serverless computing task; determining a supplemental placement of a function of the serverless computing task to a second host determined to be a second optimal host for accelerating execution of the function, wherein the function is not able to accelerated by one or more FPGAs in the first host; and executing the serverless computing task on the first host and the second host according to the initial placement and the supplemental placement.

In Example 2, the method in Example 1 can further include: determining the initial placement of the serverless computing task, wherein determining the initial placement comprises: estimating execution time of the serverless computing task for each host over a plurality of hosts; and selecting the first host having less execution time than other hosts.

In Example 3, the method in Example 1 or 2 can further include triggering the supplemental placement based on an actual input data size to the function during run-time exceeding a predicted input data size to the function.

In Example 4, the method in any one of Examples 1-3 can further include determining the supplemental placement of the function comprising: estimating network communication overhead of data being redirected from the first host to each host which is not the first host, estimating execution time of the function on each host which is not the first host, and selecting the second host having less network communication overhead and execution time than other hosts.

In Example 5, the method in any one of Examples 1-4 can further include executing the serverless computing task on the first host and the second host comprising: provisioning a first data forwarder for forwarding data to be processed by the function from the first host to the second host; and executing the function on a FPGA on the second host.

In Example 6, the method in Example 5 can further include executing the serverless computing task on the first host and the second host further comprising: provisioning a second data forwarder for forwarding data output by the function from the second host to the first host.

In Example 7, the method in any one of Examples 1-6 can further include receiving tickets from the first host and the second host comprising information associated with available FPGA-accelerable functions on the first host and information associated with available FPGA-accelerable functions on the second host, wherein performing the initial placement and determining the supplemental placement comprise determining the initial placement and the supplemental placement based on the tickets.

Example 8 is a system comprising: at least one memory element; at least one processor coupled to the at least one memory element; an interface that when executed by the at least one processor is configured to receive, from a user, a definition of a serverless computing task comprising one or more functions to be executed, wherein at least one of the functions is able to be accelerated by one or more FPGAs provided in hosts of a serverless computing environment; a task scheduler that when executed by the at least one processor is configured to: perform an initial placement of the serverless computing task to a first host determined to be a first optimal host for executing the serverless computing task, and determine a supplemental placement of a function of the serverless computing task to a second host determined to be a second optimal host for accelerating execution of the function, wherein the function is not able to accelerated by one or more FPGAs in the first host; and one or more workers provisioned in networked hardware resources of a serverless computing environment that when executed by the at least one processor is configured to execute the serverless computing task on the first host and the second host according to the initial placement and the supplemental placement.

In Example 9, the system in Example 8 can further include the task scheduler being further configured to determine the initial placement of the serverless computing task, wherein determining the initial placement comprises: estimating execution time of the serverless computing task for each host over a plurality of hosts; and selecting the first host having less execution time than other hosts.

In Example 10, the system in Example 8 or 9 can further include a forwarder that when executed by the at least one processor is configured to trigger the supplemental placement based on an actual input data size to the function during run-time exceeding a predicted input data size to the function.

In Example 11, the system in any one of Examples 8-10 can further include determining the supplemental placement of the function comprising: estimating network communication overhead of data being redirected from the first host to each host which is not the first host; estimating execution time of the function on each host which is not the first host; and selecting the second host having less network communication overhead and execution time than other hosts.

In Example 12, the system in any one of Examples 8-11 can further include executing the serverless computing task on the first host and the second host comprising: provisioning a first data forwarder for forwarding data to be processed by the function from the first host to the second host; and executing the function on a FPGA on the second host.

In Example 13, the system in Example 12 can further include executing the serverless computing task on the first host and the second host further comprising provisioning a second data forwarder for forwarding data output by the function from the second host to the first host.

In Example 14, the system in any one of Examples 8-13 can further include a resource manager that when executed by the at least one processor being configured to: receive tickets from the first host and the second host comprising information associated with available FPGA-accelerable functions on the first host and information associated with available FPGA-accelerable functions on the second host; wherein performing the initial placement and determining the supplemental placement comprise determining the initial placement and the supplemental placement based on the tickets.

Example 15 includes one or more computer-readable non-transitory media comprising instructions, that when executed on one or more processors configure the one or more processors to perform operations comprising: receiving, from a user, a definition of a serverless computing task comprising one or more functions to be executed, wherein at least one of the functions is able to be accelerated by one or more FPGAs provided in hosts of a serverless computing environment; performing an initial placement of the serverless computing task to a first host determined to be a first optimal host for executing the serverless computing task; determining a supplemental placement of a function of the serverless computing task to a second host determined to be a second optimal host for accelerating execution of the function, wherein the function is not able to accelerated by one or more FPGAs in the first host; and executing the serverless computing task on the first host and the second host according to the initial placement and the supplemental placement.

In Example 16, the one or more computer-readable non-transitory media in Example 15 can further include the operations further comprising determining the initial placement of the serverless computing task, wherein determining the initial placement comprises: estimating execution time of the serverless computing task for each host over a plurality of hosts; and selecting the first host having less execution time than other hosts.

In Example 17, the one or more computer-readable non-transitory media in Example 15 or 16 can further include the operations further comprising triggering the supplemental placement based on an actual input data size to the function during run-time exceeding a predicted input data size to the function.

In Example 18, the one or more computer-readable non-transitory media in any one of Examples 15-17 can further include determining the supplemental placement of the function comprising: estimating network communication overhead of data being redirected from the first host to each host which is not the first host, estimating execution time of the function on each host which is not the first host, and selecting the second host having less network communication overhead and execution time than other hosts.

In Example 19, the one or more computer-readable non-transitory media in any one of Examples 15-18 can further include executing the serverless computing task on the first host and the second host comprising: provisioning a first data forwarder for forwarding data to be processed by the function from the first host to the second host; executing the function on a FPGA on the second host; and provisioning a second data forwarder for forwarding data output by the function from the second host to the first host.

In Example 20, the one or more computer-readable non-transitory media in any one of Examples 15-19 can further include the operations further comprising receiving tickets from the first host and the second host comprising information associated with available FPGA-accelerable functions on the first host and information associated with available FPGA-accelerable functions on the second host; wherein performing the initial placement and determining the supplemental placement comprise determining the initial placement and the supplemental placement based on the tickets.

Example 21 includes one or more apparatuses comprising means for implementing and/or carrying out any one of the methods in Examples 1-8.

Variations and Implementations

Within the context of the disclosure, the cloud includes a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

As used herein in this Specification, the term 'network element' or 'node' in the cloud is meant to encompass any of the aforementioned elements, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the disclosed operations. This may be inclusive of appropriate algorithms and communication protocols that allow for the effective exchange of data or information.

In one implementation, components seen in FIGS. 1, 4-5, 7, and 9, and other components described herein may include software to achieve (or to foster) the functions discussed herein for serverless computing with FPGA acceleration where the software is executed on one or more processors to carry out the functions. This could include the implementation of instances of an interface 102, task scheduler 106, various forwarders illustrated by FIG. 5, rule checker 180, notifier 108, and FPGA resource manager 702, and/or any other suitable element that would foster the activities discussed herein. Additionally, each of these elements can have an internal structure (e.g., a processor, a memory element, etc.) to facilitate some of the operations described herein. Exemplary internal structure includes elements shown in data processing system in FIG. 9. In other embodiments, these functions for serverless computing with FPGA acceleration may be executed externally to these elements, or included in some other network element to achieve the intended functionality. Alternatively, the components seen in FIG. 1 and other components described herein may include software (or reciprocating software) that can coordinate with other network elements in order to achieve the functions associated with serverless computing with FPGA acceleration described herein. In still other embodiments, one or several devices may include any suitable algorithms, hardware, software, components, modules, interfaces, or objects that facilitate the operations thereof.

In certain example implementations, the functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store information described herein, such as task definitions, task queues, rules, information associated with resources, tickets, and information for facilitating initial placement and supplemental placement. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a FPGA, an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the optimization functions, as outlined herein. Additionally, each of these devices may include a processor that can execute software or an algorithm to perform the optimization activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of serverless computing and task scheduling, as potentially applied to a myriad of other architectures.

It is also important to note that the parts of the flow diagram in the FIG. 6 illustrate only some of the possible scenarios that may be executed by, or within, the components shown (e.g., in FIGS. 1, 4-5, 7, and 9) and described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the components shown and described herein, in that any suitable arrangements, chronologies, configurations, and timing mechanisms may be provided without departing from the teachings of the present disclosure.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, FPGA, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the FIGURES, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

One or more advantages mentioned herein does not in any way suggest that any one of the embodiments necessarily provides all the described advantages or that all the embodiments of the present disclosure necessarily provide any one of the described advantages.

What is claimed is:

1. A method for field programmable gate array (FPGA) accelerated serverless computing, the method comprising:
   receiving, from a user, a definition of a serverless computing task with one or more functions including at least one function able to be accelerated by FPGAs provided in a plurality of hosts of a serverless computing environment;
   performing an initial placement of the serverless computing task to a first host of the plurality of hosts, the first host determined to be a first optimal host for executing the serverless computing task;
   determining a supplemental placement of another function of the serverless computing task to a second host of the plurality of hosts, the second host determined to be a second optimal host for accelerating execution of the another function, the another function not able to be accelerated by one or more of the FPGAs in the first host; and
   executing the serverless computing task on the first host and the second host according to the initial placement and the supplemental placement, the executing of the serverless computing task on the first host and the second host including provisioning a first data forwarder for forwarding data to be processed by the another function from the first host to the second host.

2. The method of claim 1, further comprising:
   determining the initial placement of the serverless computing task by estimating execution time of the serverless computing task for each of the plurality of hosts and selecting the first host having less execution time than other hosts of the plurality of hosts.

3. The method of claim 1, further comprising:
   triggering the supplemental placement based on an actual input data size to the another function during run-time exceeding a predicted input data size to the another function.

4. The method of claim 1, wherein the determining of the supplemental placement of the another function includes estimating network communication overhead of data being redirected from the first host to other hosts of the plurality of hosts, estimating execution time of the another function on each of the other hosts, and selecting the second host having less network communication overhead and execution time than the other hosts.

5. The method of claim 1, wherein the executing of the serverless computing task on the first host and the second host includes executing the another function on another one of the FPGAs on the second host.

6. The method of claim 5, wherein the executing of the serverless computing task on the first host and the second host includes provisioning a second data forwarder for forwarding data output by the another function from the second host to the first host.

7. The method of claim 1, further comprising:
   receiving tickets from the first host and the second host with information associated with available FPGA-accelerable functions on the first host and other information associated with other available FPGA-accelerable functions on the second host;
   wherein the performing of the initial placement and the determining of the supplemental placement includes determining the initial placement and the supplemental placement based on the tickets.

8. A system comprising:
   at least one memory element;
   at least one processor coupled to the at least one memory element;
   an interface that when executed by the at least one processor is configured to receive, from a user, a definition of a serverless computing task with one or more functions to be executed, the one or more functions including at least one function able to be accelerated by one or more FPGAs provided in a plurality of hosts of a serverless computing environment;
   a task scheduler that when executed by the at least one processor is configured to perform an initial placement of the serverless computing task to a first host of the plurality of hosts determined to be a first optimal host for executing the serverless computing task, and determine a supplemental placement of another function of the serverless computing task to a second host of the plurality of hosts determined to be a second optimal host for accelerating execution of the another function, the another function not able to be accelerated by the one or more FPGAs; and
   one or more workers provisioned in networked hardware resources of the serverless computing environment that when executed by the at least one processor is configured to execute the serverless computing task on the first host and the second host according to the initial placement and the supplemental placement, executing the serverless computing task on the first host and the second host including provisioning a first data forwarder for forwarding data to be processed by the another function from the first host to the second host.

9. The system of claim 8, wherein the task scheduler is further configured to determine the initial placement of the serverless computing task by estimating execution time of the serverless computing task for each of the plurality of hosts and selecting the first host having less execution time than other hosts of the plurality of hosts.

10. The system of claim 8, wherein the supplemental placement is triggered based on an actual input data size to the another function during run-time exceeding a predicted input data size to the another function.

11. The system of claim 8, wherein determining the supplemental placement of the another function includes estimating network communication overhead of data being redirected from the first host to other hosts of the plurality of hosts, estimating execution time of the another function on each of the other hosts, and selecting the second host having less network communication overhead and execution time than the other hosts.

12. The system of claim 8, wherein executing the serverless computing task on the first host and the second host includes executing the another function on a second host FPGA on the second host.

13. The system of claim 12, wherein executing the serverless computing task on the first host and the second host includes provisioning a second data forwarder for forwarding data output by the another function from the second host to the first host.

14. The system of claim 8, further comprising,
a resource manager that when executed by the at least one processor is configured to receive tickets from the first host and the second host with information associated with available FPGA-accelerable functions on the first host and other information associated with other available FPGA-accelerable functions on the second host, performing the initial placement and determining the supplemental placement includes determining the initial placement and the supplemental placement based on the tickets.

15. One or more computer-readable non-transitory media comprising instructions, that when executed on one or more processors configure the one or more processors to perform operations comprising:
receiving, from a user, a definition of a serverless computing task with one or more functions including at least one function able to be accelerated by FPGAs provided in a plurality of hosts of a serverless computing environment;
performing an initial placement of the serverless computing task to a first host of the plurality of hosts, the first host determined to be a first optimal host for executing the serverless computing task;
determining a supplemental placement of another function of the serverless computing task to a second host of the plurality of hosts, the second host determined to be a second optimal host for accelerating execution of the another function, the another function not able to be accelerated by one or more of the FPGAs in the first host; and
executing the serverless computing task on the first host and the second host according to the initial placement and the supplemental placement, the executing of the serverless computing task on the first host and the second host including provisioning a first data forwarder for forwarding data to be processed by the another function from the first host to the second host.

16. The one or more computer-readable non-transitory media of claim 15, wherein the operations include determining the initial placement of the serverless computing task by estimating execution time of the serverless computing task for each of the plurality of hosts and selecting the first host having less execution time than other hosts of the plurality of hosts.

17. The one or more computer-readable non-transitory media of claim 15, wherein the operations include triggering the supplemental placement based on an actual input data size to the another function during run-time exceeding a predicted input data size to the another function.

18. The one or more computer-readable non-transitory media of claim 15, wherein the determining of the supplemental placement of the another function includes estimating network communication overhead of data being redirected from the first host to other hosts of the plurality of hosts, estimating execution time of the another function on each of the other hosts, and selecting the second host having less network communication overhead and execution time than the other hosts.

19. The one or more computer-readable non-transitory media of claim 15, wherein the executing of the serverless computing task on the first host and the second host includes executing the another function on a second host FPGA on the second host, and provisioning a second data forwarder for forwarding data output by the another function from the second host to the first host.

20. The one or more computer-readable non-transitory media of claim 15, wherein the operations include receiving tickets from the first host and the second host with information associated with available FPGA-accelerable functions on the first host and other information associated with other available FPGA-accelerable functions on the second host, the performing of the initial placement and the determining of the supplemental placement includes determining the initial placement and the supplemental placement based on the tickets.

* * * * *